April 8, 1924.

H. P. STEVENS

PACKING RING

Filed Feb. 25, 1921

1,489,857

Inventor
Harry P. Stevens,
By his Attorneys
Sheffield & Betts

Patented Apr. 8, 1924.

1,489,857

UNITED STATES PATENT OFFICE.

HARRY P. STEVENS, OF NEW YORK, N. Y., ASSIGNOR TO STEVENS MOTORS, INC., OF NEW YORK, N. Y., A CORPORATION OF NEW YORK.

PACKING RING.

Application filed February 25, 1921. Serial No. 447,658.

*To all whom it may concern:*

Be it known that I, HARRY P. STEVENS, a citizen of the United States, residing in the borough of Manhattan, in the city, county, and State of New York, have invented certain new and useful Improvements in Packing Rings, of which the following is a full, clear, and complete description.

My invention relates to improvements in the art of packing relatively moving surfaces against escape of gas or the like, under pressure, and relates more particularly to the provision of a ring-like packing structure designed for use in internal combustion engines like that of my application Serial No. 309,327, filed July 8, 1919, now Patent No. 1,385,099, dated July 19, 1921.

The principal object of this invention is to produce a simple, efficient and gas tight packing capable of withstanding high temperatures and pressures for use between relatively moving surfaces and in which the friction produced by the packing is materially less than that produced by similar types of packing heretofore known.

A second object of my invention is to provide a packing structure of a type which shall be highly efficient while capable of cheap and very ready manufacture and installation.

A further object of my invention is to provide a novel and rapid method or process for making a rugged and efficient metallic packing structure.

The novel features of my invention are pointed out with particularity in the appended claims. The invention itself, however, with further objects and advantages, will best be understood from the following description taken in connection with the accompanying drawing in which—

Figure 1:
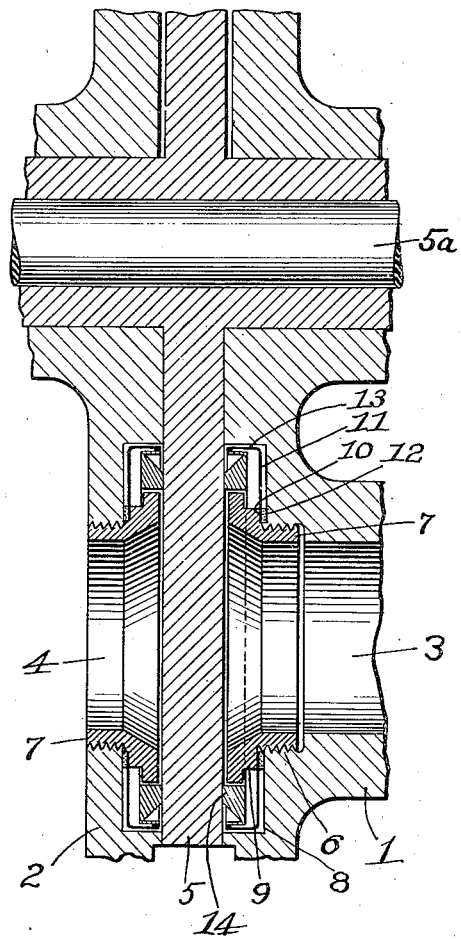
Figure 2:
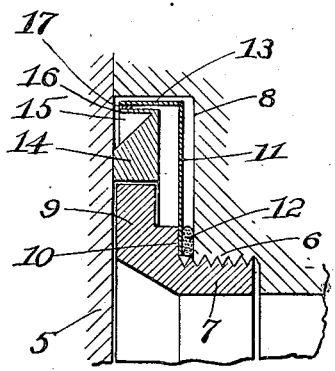

Fig. 1 is a sectional view through one half of a disk valve of an internal combustion engine; and Fig. 2 is a detail sectional view on an enlarged scale of the metallic packing according to my invention shown in Fig. 1.

In the drawing, 1 and 2 are portions of a fixed structure, such, for instance, as the cylinder and cylinder head of an internal combustion engine, parts 1 and 2 having registering ports therein designated as 3 and 4 respectively. 5 is a valve disk mounted to rotate with the shaft 5ª and lying between the parts 1 and 2. It is understood that the disk 5 has openings therein (not shown) which register with the ports 3 and 4 at appropriate times in the rotation of the disk 5. One of the parts 3 or 4, or both of them, containing at intervals gas or the like under high pressure, I have illustrated the packing means according to my invention for preventing the escape of gas from ports 3 and 4 along the surface of the valve disk 5. The parts 1 and 2 are internally screw threaded as shown at 6 to receive correspondingly threaded annular flanges or nipples, such as 7. As illustrated, the packing structures associated with both ports 3 and 4 are identical and consequently only one will be described in detail. The member 1, for instance, is preferably countersunk or machined to provide the annular recess 8 surrounding the end of the threaded portion 6 which lies nearer the disk 5, the disk closing one side of this recess, as shown. The threaded flange 7 is enlarged, as indicated at 9, at the end adjacent the valve disk, thereby providing the shoulder 10 which extends out over the face of the recess 8, and I employ such shoulder to clamp in place against the face of the recess 8, a resilient ring-like diaphragm 11. I also provide a gasket 12 immediately surrounding the reduced threaded portion of the flange 7 against which the inner edge of the diaphragm is held by the shoulder 10 when the nipple 7 is screwed into place. Gasket 12 is preferably of copper or other material adapted to withstand a comparatively high temperature. By the construction just described the leakage of gas along the threaded portion 6 and its escape from the port 3 in this manner is effectually prevented. It is evident that the inner edge of diaphragm 11 is securely fastened or anchored in place, but the outer edge of this member is free and is provided with a lateral flange 13 extending from the plane of the annular diaphragm 11 toward the valve disk 5. Within the cylindrical flange 13 is a bearing ring 14 which is secured to the flange 13 and held thereby in contact with the face of the rotating disk 5. The ring 14 is preferably made of tempered steel and is substantially inflexible as compared with the resilient diaphragm or ring 11. In order to connect members 13 and 14 quickly and easily, but at the same time securely, and without drawing the temper from these members, I form a groove adjacent the margin of ring 14, as shown at 15, thereby forming a thin lip or flange on the ring 14 which reduces its outer portion to a thin circumferential lip 16 of approximately the same thickness as the cylindrical flange 13.

The diameter of ring 14 is substantially the same as or slightly less than the diameter of the inner surface of the flange 13, and I unite parts 13 and 16 by placing the ring 14 within the flange 13 with a thin strip of silver solder 17 or similar material interposed between said lip and flange, after which heat is applied thereto, such as by an oxyacetylene flame, and said parts securely brazed or fused together. The masses of the two parts at the point of contact being substantially the same by virtue of the structure just described, I am able to substantially weld parts 13 and 16 together without drawing the temper of the main portion of the ring 14. It is preferable to use hard or high temperature solder or brass in order to prevent the parts from being separated under the high working temperatures of a gas engine.

In this way the parts are united firmly together without heating the diaphragm 11 and ring 14 to such a temperature as would draw the temper of the working portions. Moreover, the joint between the lip 16 and the flange 13 is securely sealed by the solder 17, thus effectually preventing the escape of gas around the packing ring at this point.

The flange 9 is separated from the valve disk 5 as well as from the inner edge of the packing ring 14, and the packing ring is separated from the resilient ring or diaphragm 11 so that gas from the port 3 may pass into the space between members 14 and 11. The pressure against the ring 14 tends to force it toward the face of the disk 5, while the pressure against the opposite face of member 11 tends to draw the ring 14 away from the disk 5. However, since the diaphragm 11 is supported at its inner edge by being fixed on the gasket 12, the fluid pressure on its excess area, greater than the area of the inner surface of the ring 14, against which the fluid pressure acts, is practically absorbed by the support for said inner margin or edge. In other words, the pressure effective at the outer margin of the diaphragm will be substantially one-half the total pressure on the diaphragm. Therefore, the area of the inner surface of the bearing ring should preferably be only about one-half, or slightly more than one-half of the area of the diaphragm 11 exposed to said fluid pressure, so that a resultant pressure, due substantially to the resilient spring action of the diaphragm 11, is obtained between the bearing ring 14 and the valve disc 5. I have discovered that the pressure between members 5 and 14 may be relatively greatly reduced as compared with what was previously considered necessary in packing structures of the type herein disclosed, it having previously been considered that the packing ring should have as much area exposed to gas pressure as possible in order to prevent leakage between the valve disk and the packing ring. Such a packing ring, having a large area exposed to gas pressure for pressing the packing ring against the moving surface, is illustrated in my prior application Serial No. 343,899. As just indicated, I prefer to make the effective area of ring 14 exposed to gas pressure little more than half such effective area of the part 11. If desired, the bearing face of the packing ring 14 may be provided with shallow oil grooves, as is well known.

It is evident that the only possible point for the escape of gas from part 3 is along the surface of the moving disk 5, the gasket 12 and the solder 17 effectually preventing leakage at the only other two possible points of escape. I am inclined to believe that the opinion heretofore held as to the necessity for high pressures between the packing ring and the moving surface was due to the fact that leakage occurred at other points which were not recognized and the pressure on the moving surface was consequently increased due to the wrong impression that the leakage was occurring at this point.

It will be seen that a packing according to my invention avoids all unnecessary friction between the contact ring and the moving surface, that it is easily and cheaply manufactured, readily installed, and that I have devised a particularly rapid and convenient method of making a rugged article embodying the objects and advantages stated above. Furthermore, it prevents all possibility of leakage between the respective parts of the packing. It is obvious that the relative areas of the stiff and resilient rings may be varied to effect other required pressures between the bearing surfaces.

While I have described my invention in connection with a moving disk valve of the type shown and described in my prior application Serial No. 309,327, filed July 8, 1919, Patent No. 1,385,099, I do not desire to be limited to the use of my invention in connection with any particular type of apparatus. Moreover, while I have described the preferred form of my invention, I do not limit myself to details of form, material, construction or arrangement of parts herein disclosed, except in so far as such details may be essential to the novelty of the subject-matter of the following claims.

Having thus described my invention, I claim:

1. Means for providing the required pressure exerted by a bearing ring upon its opposed bearing surface which comprises a stiff bearing ring and a concentric resilient diaphragm having one margin connected with said ring and separated therefrom by intervening space, the other margin of which is adapted to rest upon a rigid support, the area of the internal surface of said ring being such that the fluid pressure exerted upon the same will be substantially counterbalanced by the fluid pressure in the opposite direction on the opposite surface of said diaphragm, and the area of the internal surface of said diaphragm being only to such an extent greater than that of the bearing ring that the resultant pressure exerted by the bearing ring on its opposed bearing surface will be substantially that due to the spring action of the diaphragm.

2. A metallic packing comprising in combination a stiff bearing ring, a resilient ring or diaphragm secured to said ring at the outer circumferences of both of said parts, said bearing ring being free at its inner margin and having substantially one-half the area of said resilient ring in planes parallel to the bearing surface, and means for securing the inner edge of said resilient ring to a fixed support.

3. The combination of a fixed support, a retaining member threaded into said support, a resilient ring clamped to said support by said member, a stiff bearing ring, said rings being connected at their outer portions and making a gas tight joint at the points of engagement, said bearing ring being free at its inner margin and having substantially one-half the area of said resilient ring in planes parallel to the bearing surface.

4. A metallic packing comprising in combination a stiff bearing ring, a resilient ring having its outer portion secured to said bearing ring at the outer margin of the bearing ring, said resilient ring acting as a resilient support for the bearing ring, said rings having a substantially integral, gas tight joint at their margins, and means for clamping the inner edge of said resilient ring to a support, and forming a gas tight joint around the inner edge of the resilient ring.

5. A metallic packing comprising in combination a bearing ring having its outer margin reduced to form a thin circumferential lip, and a resilient ring substantially integral with said bearing ring at said lip and forming a gas tight joint therewith.

6. A metallic packing comprising a bearing ring having its outer margin reduced to form a thin circumferential lip, and a resilient ring substantially integral with said bearing ring at said lip, said rings being united at said lip by fusible material and forming a gas tight joint with each other.

HARRY P. STEVENS.